US006185733B1

(12) United States Patent
Breslau et al.

(10) Patent No.: US 6,185,733 B1
(45) Date of Patent: *Feb. 6, 2001

(54) METHOD AND APPARATUS FOR REMOTE OBJECT CODE INCLUSION

(75) Inventors: Franklin C. Breslau, Teaneck, NJ (US); Paul G. Greenstein, Croton-on-Hudson; John T. Rodell, Poughkeepsie, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/009,444

(22) Filed: Jan. 20, 1998

(51) Int. Cl.$^7$ .................................................. G06F 9/45
(52) U.S. Cl. ........................... 717/5; 717/10; 709/331
(58) Field of Search ................... 395/701, 702, 395/703, 705, 710; 709/305, 217–219, 312, 331, 332; 707/513; 717/1–5, 10

(56) References Cited

U.S. PATENT DOCUMENTS

| | | | |
|---|---|---|---|
| 4,567,574 | * 1/1986 | Saade et al. .......................... 395/709 |
| 5,023,907 | 6/1991 | Johnson et al. .......................... 380/4 |
| 5,185,860 | 2/1993 | Wu ........................................ 395/200 |
| 5,204,897 | 4/1993 | Wyman .................................... 380/4 |
| 5,247,678 | * 9/1993 | Littleton ................................ 709/305 |
| 5,303,376 | * 4/1994 | Taki ........................................ 395/710 |
| 5,313,635 | * 5/1994 | Ishizuka et al. ...................... 395/705 |
| 5,339,435 | 8/1994 | Lubkin et al. .......................... 395/700 |
| 5,371,852 | 12/1994 | Attanasio et al. ..................... 395/200 |
| 5,381,547 | * 1/1995 | Flug et al. .............................. 709/305 |
| 5,386,369 | 1/1995 | Christiano ............................. 364/464 |
| 5,394,546 | * 2/1995 | Hanatsuka ................................. 707/4 |
| 5,418,957 | 5/1995 | Narayan .................................. 395/700 |
| 5,437,029 | 7/1995 | Sinha ..................................... 395/600 |
| 5,499,340 | 3/1996 | Barritz .................................... 395/184 |
| 5,517,635 | 5/1996 | Cross et al. ........................... 395/500 |
| 5,613,120 | * 3/1997 | Palay et al. ............................ 395/710 |
| 5,692,196 | * 11/1997 | Unni et al. ............................. 395/705 |
| 5,706,502 | * 1/1998 | Foley et al. ............................. 707/10 |
| 5,708,811 | * 1/1998 | Arendt et al. ......................... 395/712 |
| 5,732,219 | * 3/1998 | Blumer et al. ........................ 709/227 |
| 5,761,499 | * 6/1998 | Sonderegger .......................... 707/10 |
| 5,778,231 | * 7/1998 | van Hoff et al. ...................... 395/705 |
| 5,867,707 | * 2/1999 | Nishida et al. ........................ 709/305 |
| 5,923,882 | * 7/1999 | Ho et al. ............................... 395/709 |

OTHER PUBLICATIONS

IBM C Set ++ for AIX Reference Summary—Version 3 Release 1 SX09–1300–01—Second Edition (Aug. 1995).

(List continued on next page.)

Primary Examiner—Kakali Chaki
(74) Attorney, Agent, or Firm—William A. Kinnaman, Jr.

(57) ABSTRACT

A method and apparatus for operating a computer linkage editor to process include statements contained in an input stream that specify object modules resident at non-connected network locations. The linkage editor also receives as input library definition statements specifying object module libraries. The linkage editor initially examines each library definition statement to determine whether it specifies an object module library resident at a non-connected network location. If it does, the linkage editor establishes a connection with the network location and obtains a list of the contents of the object module library via the connection. The linkage editor then examines each include statement to determine whether it specifies an object module resident at a non-connected network location. If it does, the linkage editor establishes a connection with the network location and obtains the object module via the connection. The retrieved object module is then edited along with other object modules into an executable load module.

22 Claims, 10 Drawing Sheets

OTHER PUBLICATIONS

IBM VSE/Enterprise Systems Architecture—VSE/Central Functions Linkage Editor Diagnosis Reference, Version 6 Release 1—First Edition (Apr. 1995) LY33–9169–00.

IBM/VSE Enterprise Systems Architecture—System Control Statements—Version 2, Release 1—First Edition (Apr. 1995)—SC33–6613–00.

IBM TDB—vol. 29, No. 8, Jan. 1997—"Execution–Time Loading . . . Stubs" M.R. Beghtel et al—p. 3521.

IBM TDB—vol. 33, No. 6B, Nov. 1990—Tracing The Exported Entry Points In An OS/2 Dynamic Link Library—R.C. Weeks—pp. 140–141.

IBM TDB—vol. 33, No. 7, Dec. 1990—Tracing the Undocumented Exported Entry Points In An OS/2 . . . Library—R.C. Weeks—pp. 273–274.

IBM TDB—vol. 34, No. 1, Jun. 1991—Alternate Image DLL Specification And Display In Office Vision/2—Bell et al—pp. 1–2.

IBM TDB—vol. 34, No. 4B, Sep. 1991—Loading DLLs by ID Rather than By Name—Cox et al—p. 19.

IBM TDB—vol. 34, No. 6, Nov. 1991—Dynamic Link Library Mechanism In DOS Environment—Johnson et al—pp. 209–210.

IBM TDB—vol. 35, No. 2, Jul. 1992—Using a Universal QIC–122 CODEC For Dynamic Linking of Ojbect Code—Medan—pp. 54–55.

IBM TDB—vol. 35, No. 7, Dec. 1992—Method and Mechanism For Dynamic Loader—Chan et al—pp. 8–13.

IBM TDB—vol. 36, No. 6A, Jun. 1993—Transparent Dynamic Link Library Interface—Lennon et al—p. 195.

IBM TDB—vol. 36, No. 10, Oct. 1993 —Transparently Separating Functions from a . . . Library—Corn et al—pp. 475–476.

IBM TDB—vol. 37, No. 2B, Feb. 1994—Dynamic Link Library for Recognizing Multiplexed Keystrokes—Marik et al—pp. 483–484.

IBM TDB—vol. 37, No. 3, Mar. 1994—Execution Trace Analysis of OS/2 2 .DLLs Using an Intercept Layer—Christensen et al—pp. 373–375.

IBM TDB—vol. 37, No. 4B —Apr. 1994—Dynamic Link Library Merge Utility Dobbelstein et al—pp. 129–134.

IBM TDB—vol. 37, No. 6B—Jun. 1994—Support for Dynamic Config of Link Support . . . UNIX—Baker, pp. 31–32.

IBM TDB—vol. 37, No. 12—Dec. 1994—Inter–Program Binding—Hicks et al—pp. 415–420.

IBM TDB—vol. 39, No. 1—Jan. 1996—Dynamic Interception Of Imported Procedure Calls—Blaschke—pp. 197–201.

IBM TDB—vol. 39, No. 4—Apr. 1996—Efficient Method for Implementing Pre–Compiled Headers for C and C ++—Brolley et al—pp. 165–170.

Phelps et al., "Towards Active, Extensible, Networked Documents: Multivalent Architecture and Applications", DL '96, ACM, 1996, pp100–108.*

"IBM VSE/ESA System Control Statements'" Version 2 Release 1, IBM, 1995, pp. 1, 251–262.*

* cited by examiner

METHOD AND APPARATUS FOR REMOTE OBJECT CODE INCLUSION

CROSS-REFERENCE TO RELATED APPLICATION

This application is related to the commonly owned, concurrently filed application of the same inventors, Ser. No. 09/009,293, entitled "METHOD AND APPARATUS FOR REMOTE SOURCE CODE INCLUSION", incorporated herein by reference.

BACKGROUND OF THE INVENTION

1. Field of the Invention

This invention is related to computer linkage editor programs and particularly to object module library search processing.

2. Description of the Related Art

Computer linkage editors are well known in the art. Basically, a computer linkage editor is a computer program for creating load modules from one or more object modules by resolving cross references among the modules and, if necessary, adjusting addresses. See, for example, the IBM publication *VSE/Central Functions, Linkage Editor, Diagnostic Reference,* IBM publication number LY33-9169, incorporated herein by reference, and a related IBM publication *System Control Statements,* IBM publication number SC33-6613, incorporated herein by reference.

An input stream to a linkage editor may contain one or more control statements known as include statements. Each include statement directs the linkage editor preprocessor to replace the statement with the contents of a specified object module. Normally, object modules referenced by include statements are contained in the input stream or reside in libraries contained in specified subdirectories. An include statement may explicitly specify the library containing an object module by specifying a drive and path location. Otherwise, object module libraries are specified by control statements that are known as library definition statements. A library definition statement is a control statement for specifying which program library or libraries to search for object modules specified in include statements. Library definition statements function in a manner similar to PATH statements in DOS and its derivatives to specify a search path for locating files (in this case, include files).

Conventionally, when linking object modules to form a load module, the library or libraries containing the object modules to be included must be resident on either a local drive or a connected network drive. Here a "connected network" means a local area network (LAN) or other network in which LAN server or other disk drives can be accessed as if they were locally connected to each client system on the LAN. In an OS/2®, Windows®, or DOS environment, the LAN server disk drives would be referred to by a drive letter such as W: or Z:. In a UNIX®-based system, access to remote files is accomplished via a network file system (NFS) and is limited to disk drives attached to systems comprising the LAN. In both the above cases, a linkage editor accesses the accessible disks as if they were locally attached.

As a result of this local access requirement for object module libraries, two sets of expenses are incurred. First, software producers pay media and distribution costs for the (sometimes rather substantial) amounts of data written on disks or CD-ROMs that are used for product distribution. Second, users have to allocate substantial amounts of space on their personal computers to store the object libraries distributed with compilers, linkage editors and product application program interfaces (APIs).

With the introduction of thin clients (cost-reduced computers having small amounts of memory and disk space that rely on a network to store most of their data), the ability to include remotely resident object modules becomes imperative.

Another reason for the present invention is related to the practice of team software development. During development of software, programmers within a development team are conventionally given access to the same local area network (LAN) so that they can easily share their data. This practice is based on the paradigm ascribing most or all of the programmers in a team to a single company developing code.

With the widespread acceptance of Internet and the emergence of virtual enterprises, this static-team paradigm is being replaced with a dynamic, widely dispersed team of programmers, cooperating on a development project across vast distances, time zones, continents, etc., making it impossible to place all of the software developers on a single LAN. It is often necessary for a team of programmers to be able to access the same set of object libraries, but which, because of the distances involved, cannot be made available on any single LAN as a single instance.

A number of products (e.g., IBM TeamConnection) exist for software version management and group development; however, they either provide programmers with access to shared data within a LAN, or replicate data among LANs or single nodes. Some way to access source libraries via a direct Internet access is what is required.

SUMMARY OF THE INVENTION

Existing linkage editors do not automatically access a non-connected network destination (for example, an arbitrary Internet location outside of a local area network) that contains object libraries, therefore, to allow the specification of either a Transmission Control Protocol/Internet Protocol (TCP/IP) address or name (to be resolved via a name server or local TCP/IP name resolution file), or a World Wide Web (WWW) Uniform Resource Locator (URL) of a non-connected system that contains the libraries required to properly create the load module under construction.

When the linkage editor encounters such a remote address specification, it calls a program which attempts to make the remote connection. If the remote connection is made, the object library specified is accessed an appropriate protocol. These remote addresses are specified to the linkage editor via a linker option, just as it is done for local include paths currently.

The present invention provides for a library definition file that contains a user ID/password, along with any other required parameters that may need to be specified, so that in the case of a protocol that has more complex access requirements, for example, the File Transfer Protocol (FTP), the linkage editor will know how to login and get the object modules it needs to include.

The present invention provides in a library definition file any information that may be necessary in case the remote library charges a fee for supplying remote object modules, such as an account number to be charged.

Then, the retrieved object module is used for linking the object code to create the load module.

DESCRIPTION OF THE PREFERRED EMBODIMENT

Figure 1:
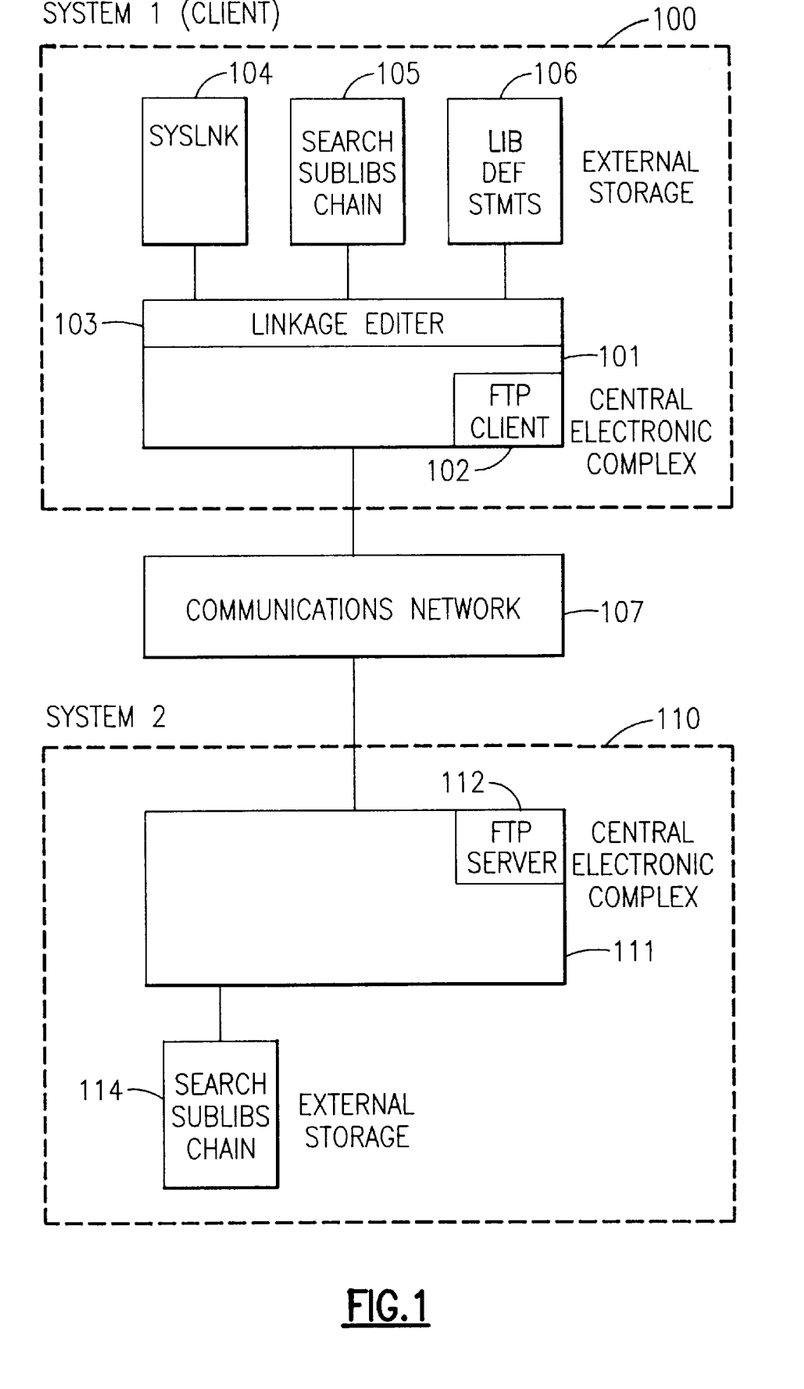
FIG. 1 shows schematically an overview of the preferred embodiment and particularly shows a first computer system executing a linkage editor that has access to a second computer system via a communications network.

FIG. 1 shows a preferred embodiment of the present invention in a client/server configuration. The configuration comprises two computer systems, a client system 100 (SYSTEM 1) and a server system 110 (SYSTEM 2), connected by means of a communications network 107. Client system 100 includes a central electronics complex (CEC) 101, while server system 110 includes a similar central electronics complex 111. Communications network 107 may be implemented using any suitable configuration or protocols; it may be a LAN or a wide-area network (WAN), or the Internet at large. In a preferred embodiment, the communications network 107 is the Internet, supporting TCP/IP communications.

Linkage editing takes place on client system 100 in a linkage editor 103 that is started by a programmer on that system. Input to the linkage editor 103 comes from an input device 104 (SYSLNK) and consists of the linkage editor statements and object modules to be linked.

Figure 4:
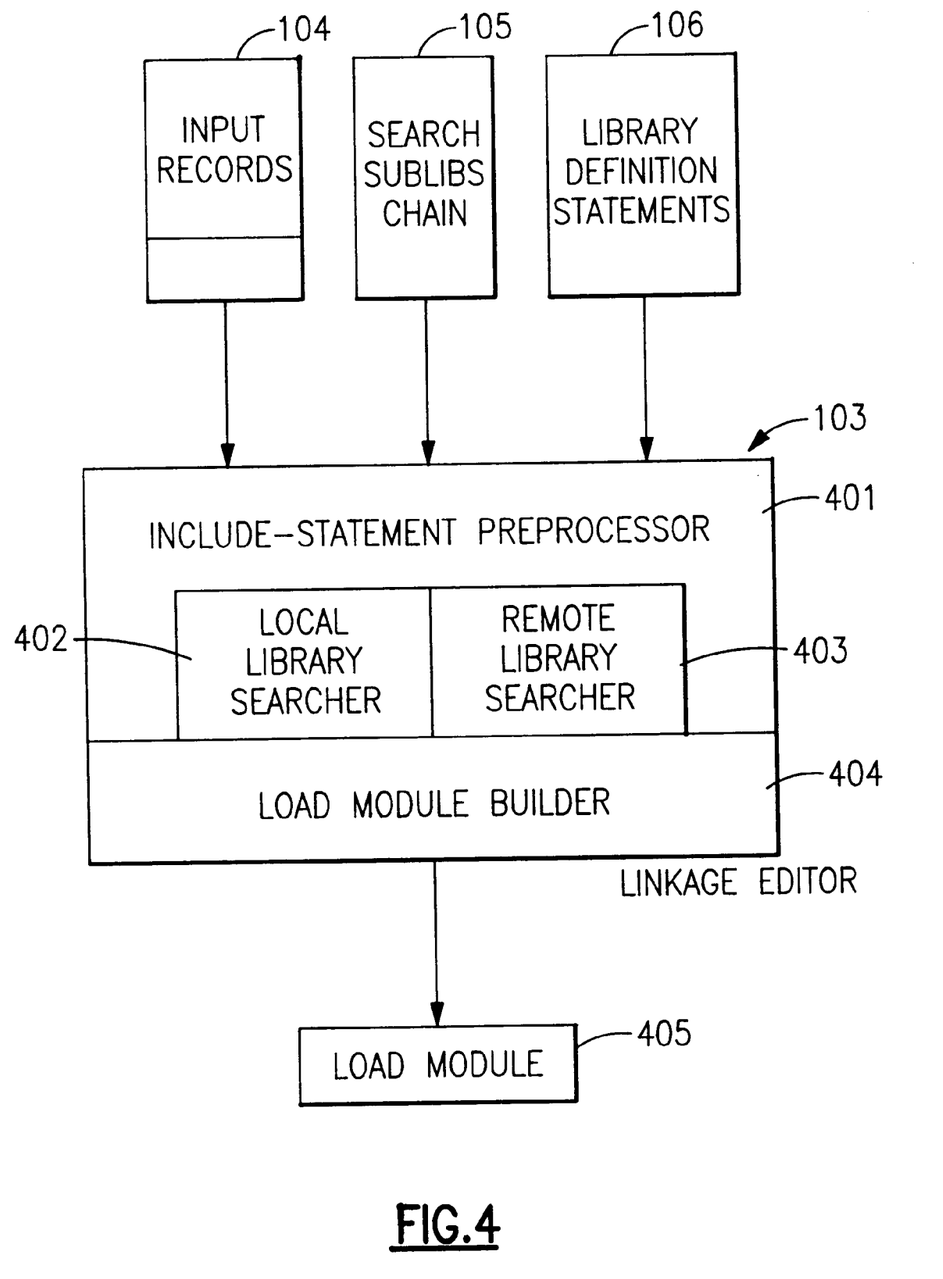
FIG. 4 shows schematically a flow chart of a preferred embodiment of a linkage editor preprocessor having a remote-include capability.

Referring to FIG. 4, linkage editor 103 comprises (either integrally or as separate components) an include statement preprocessor 401, local and remote object module library searchers 402 and 403, and a load module builder 404. Linkage editor 103 reads in input records 104 and generates a load module 405 as an output.

Figure 2:
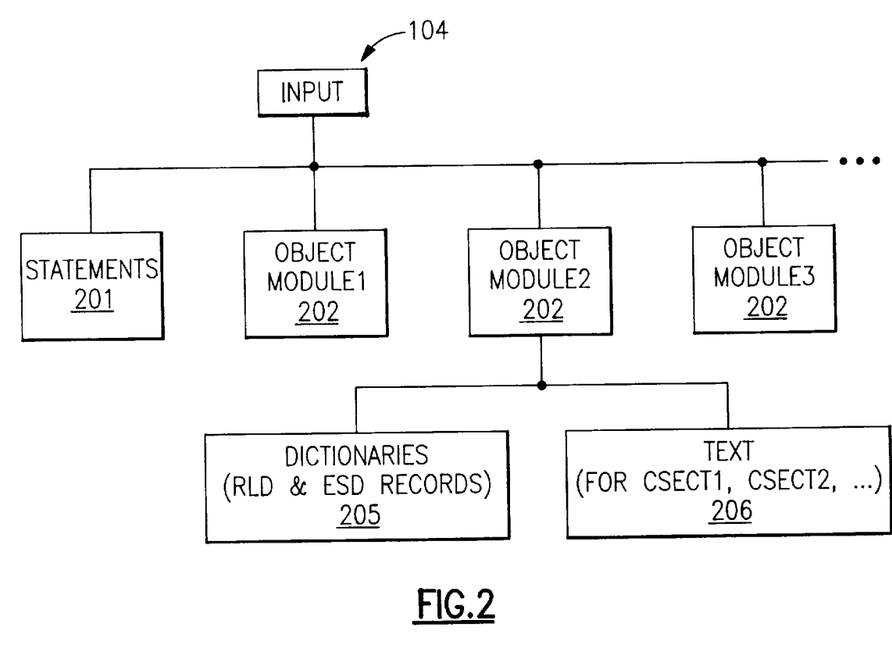
FIG. 2 shows representative linkage editor library definition statements used in a preferred embodiment.

Referring to FIG. 2, the input records 104 to the linkage editor 103 comprise control statements 201 and object modules 202 produced by language translators such as assemblers or compilers (not shown). Each object module 202 in turn consists of dictionaries 205, including external symbol dictionaries (ESDs) and relocation list dictionaries (RLDs), and text 206 that, in the embodiment shown, consists of executable instructions and data fields in the form of control sections (CSECTs). Dictionaries 205 contain the information necessary for the linkage editor 103 to resolve references between different modules 202 and to relocate the program.

The external symbol dictionary (ESD) contains records of several different types. An ESD record of particular interest in the present invention is the external reference (ER) record. An ER record contains the name of a reference in another module, generated in the present embodiment by the assembler instruction EXTRN or a V-type address constant in the source module. When the linkage editor 103 reads an object module 202, it stores the ESD information 205 in its control dictionary (CD) and writes the information from the text 206 into the linkage editor output being built.

Figure 14:
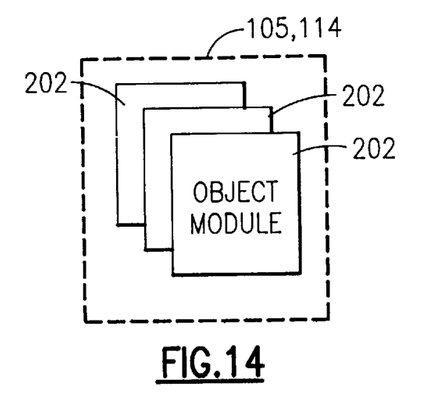
FIG. 14 shows a search library.

Referring to FIG. 14, in addition to the object modules 202 in input records 104, object modules 202 to be linked may reside either in local object module or search libraries 105 on local system 100 or in remote object module or search libraries or 114 on a remote system 110. Modules 202 in remote search libraries 114 are retrieved by the linkage editor 103 by means of an FTP client 102, which communicates with an FTP server 112 on the remote system 110 to transfer the designated object modules 202 from the remote search libraries 114 to the local system 100.

Although an FTP client 102 and server 112 are shown in FIG. 1, the present invention is not limited to any specific transfer protocol. Other protocols may be used instead, such as Hypertext Transfer Protocol (HTTP) or Trivial File Transfer Protocol (TFTP).

Although not directly relevant to the present invention, an external storage device 106 (SYS001) is used by the linkage editor 103 as an intermediate storage device for information when internal buffers are full.

Object modules 202 can be specified to linkage editor 103 either explicitly, by use of an explicit include statement 201, or implicitly, for example via an external reference record within another object module 202.

There are two types of control statements 201 relevant to the present invention: library definition statements and include statements. Include statements (in input records 104) specify the insertion of specified object modules at given points in the load module, while library definition statements (input 106) specify the search paths used for locating files referenced by include statements.

As one example of a library definition statement, in an IBM VSE/ESA operating system environment the sequence of sublibraries to be searched for input object modules is specified by a LIBDEF statement of the form:

//LIBDEF OBJ, SEARCH=lib.sublib where LIBDEF, OBJ and SEARCH are keywords and lib and sublib are variables indicating a particular library and sublibrary within the library. Up to 15 of such libraries may be specified by concatenating individual sublibrary specifications and enclosing the entire series in parentheses, so as to produce a statement of the type:

//LIBDEF OBJ, SEARCH=(lib1.sublib1, . . . ,libn.sublibn)

This sequence is called a search sublibrary chain (or simply search library) chain, and a sublibrary in this chain is called a search sublibrary (or simply search library). (The hierarchy of libraries and sublibraries is a feature of the VSE/ESA environment and is not a part of the present invention. In the present specification, the terms "library" and "sublibrary" may be used interchangeably when the distinction is not relevant.)

Figure 3:
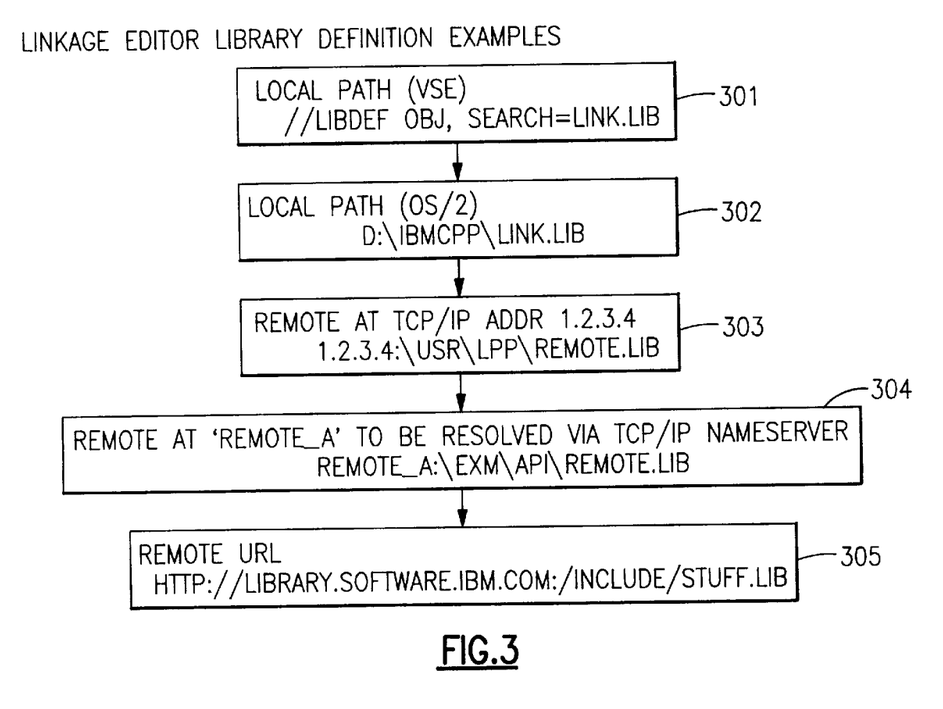
FIG. 3 shows schematically an overview of a linkage editor, comprising an include-option preprocessor that has a remote-include capability.

FIG. 3 shows representative library definition statements for both local and remote library specifications. These statements permit the linkage editor 103 to determine the location of the object modules 202 it needs to process. Although the statements shown are defined for specific platforms, it will be understood by persons skilled in the art that the techniques of this invention apply to other linkage editors and other types of systems besides the ones that have been enumerated in FIG. 3.

As already noted above, a local library definition statement 301 for the IBM VSE/ESA (TM) operating system consists of the general parameter identifier // followed immediately by the parameter name LIBDEF and the parameter value OBJ, SEARCH=link.lib. The parameter value represents a local VSE directory, thus implying that the library link.lib can be accessed using file system access methods on the local system 110. A list of up to 15 sublibraries may be specified in one search chain, in which case the sublibrary names in the list are enclosed in parentheses and separated by commas. Note that some operating systems permit multiple library definition statements to effect a list of search libraries.

Similar library definition statements exist for other OS environments. Thus, for the IBM OS/2 operating system, the library definition statement 302 of the form:

-ID:\ibmcpp\link.lib specifies a library in subdirectory \ibmcpp\link.lib on drive D. Similarly, for the IBM AIX® operating system, a UNIX-based system, the library definition statement:

-l/urs/lpp/xlc/link.lib specifies a library in local subdirectory /usr/lpp/xlc/link.lib. (In UNIX-based systems, the forward slash is used to indicate directory hierarchies rather than the backslash that is used in DOS, Windows and OS/2. So long as no confusion with any other demarcation symbol arises, their orientation is irrelevant to the present invention.)

In accordance with the present invention, a remote search library specification may be made in a manner similar to the local search library specifications described above, except that the specified library is on a (disconnected) remote system rather than a local one. Thus, in an AIX system modified in accordance with the present invention, a library definition statement 303 of the form:

-l1.2.3.4:/usr/lpp/remote.lib may be used to specify a library residing in a subdirectory /usr/lpp/remote.lib of a remote host having the explicit (i.e., quad decimal) TCP/IP address 1.2.3.4. When the search library value of 1.2.3.4:/usr/lpp/remote.lib is detected by the linkage editor 103, it will understand that this string, including a colon (:) in the middle, is not a valid AIX path designation. The colon delimiter separates the IP address 1.2.3.4 from the rest of the library name. Once the linkage editor 103 detects that an IP address has been specified for this library 114, it will treat this as a remote library specification, which should be accessed via FTP by connecting to the IP address indicated by the part of the parameter value that precedes the colon. Subsequently, an FTP transfer from system 1.2.3.4 (in this case, system 110) will be initiated. When the system 1.2.3.4 is reached by the FTP client 102, the FTP client will obtain a list of object modules in the directory /usr/lpp/remote.lib (called a library contents file) from the FTP server 112 on the target remote system.

In a similar manner, instead of an explicit IP address, a TCP/IP name resolvable by a TCP/IP name server may be used, as shown in an example of an OS/2 remote include path specification 304. In this case, even though the colon is valid within an OS/2 path string, the linkage editor 103 will observe that REMOTE_A is not a valid drive designator, and therefore must be interpreted to be a network destination for the location of the search library path \exm\api\remote.lib. Consequently, a contents file for that path on system REMOTE_A will be retrieved via FTP for subsequent use. In a similar manner, a more complex system name (e.g., remote.sys.ibm.com) may be used instead of the simple name REMOTE_A.

Still another way to indicate a remote path is by means of a uniform resource locator (URL), as shown in example 305. In this case, the linkage editor 103 will determine the remote location designation as: http://LIBRARY.SOFTWARE.IBM.COM. Because the remote location name is prefixed with http://, the linkage editor 103 will use the HTTP protocol to retrieve a contents file for the designated path /include/stuff.lib and store the contents file in a temporary library for HTTP accesses. The temporary library path is then added to the library search list for later searching, as described below.

Include statements, as noted above, direct the insertion of a specified object module at the insertion point. In an IBM VSE/ESA environment, include statements have the form:

INCLUDE modulename where INCLUDE is a keyword and modulename is a variable name specifying the name of an object module to be included in the load module under construction by the linkage editor 103. The INCLUDE statement causes the linkage editor 103 to search for a library member with the specified name along the OBJ search library chain. If found, the linkage editor process continues with the records from this member until an object module END record is found as last member record. The contents of the member can be an object module (single or multiple) or a list of control statements (link list) or both. Using further include statements in the member allows nesting.

The include statement syntax allows implicit path specification for object modules 202 (in which case the whole of the library search chain is searched for a specific object module 202 to be included) or explicit object module specification which overrides the default search chain and indicates the exact location of an object module 202 to be included, for example, 'INCLUDE D:\a\b\c\xxx.h', where the double quotes denote explicit file designation. The same syntax rules that were described above would apply for explicit object module designation, so the following include statements are possible within a linkage editor input stream 104:

INCLUDE 1.2.3.4:/usr/lpp/remotelib/file.hh
INCLUDE REMOTE_ SOURCE.SERVER.IBM.COM:D:\exm\api\remotelib\ exmpjapc.h (note that the second colon is the drive designation)
INCLUDE http://SEARCH.SOFTWARE.IBM.COM:/ include/stuff/somefile.h As already noted, object module search libraries 105 and 114 can also be specified via library definition statements on the linkage editor invocation.

The INCLUDE statement preprocessor 401 will search local search libraries for the specified object modules using the local library searcher 402.

In a preferred embodiment an INCLUDE statement has the following format:

INCLUDE modulename,(namelist)

where both modulename and (namelist) are optional parameters. INCLUDE indicates that an object module or further control statements are to be included for execution by the linkage editor 103. If a modulename is specified, the linkage editor 103 searches for a library member with the specified name along the OBJ sublibrary chain. If found, the linkage editor process continues with the records retrieved from the specified member until an object module END record is found as last member record.

If a namelist is specified, only those control sections (CSECTs) of a module are selected for the load module generation, whose names match one of the names in the namelist.

Include statements 201 indicate that an object module 202 or further control statements 201 are to be included for execution by the linkage editor 103. An include statement 201 can specify the name of an object module 202. If a module name is specified, the linkage editor 103 searches for a library member with that name along the library search chain. If the module name includes the path, the module is retrieved from the specified library. In either case, the module is retrieved and processed as if it were part of the input stream 202–204 to the linkage editor 103.

Figure 7:
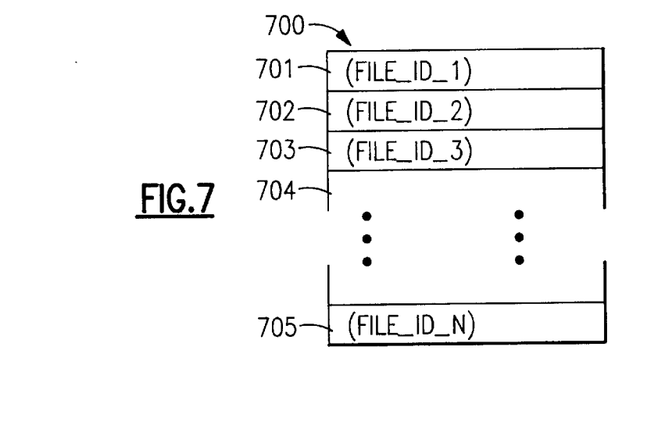
FIG. 7 shows a library contents file.
Figure 10:
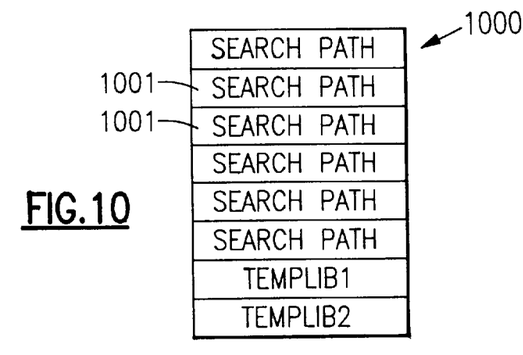
FIG. 10 shows the search library list.
Figure 11:
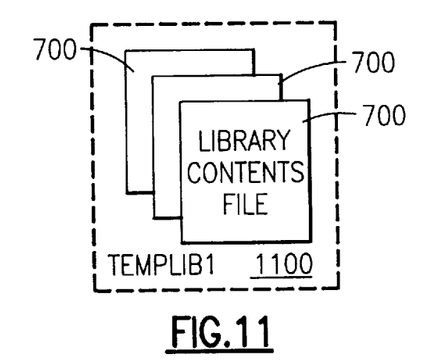
FIG. 11 shows the temporary library (TEMPLIB1) for FTP access.
Figure 12:
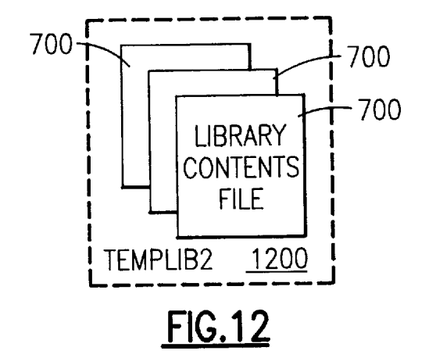
FIG. 12 shows the temporary library (TEMPLIB2) for HTTP access.
Figure 13:
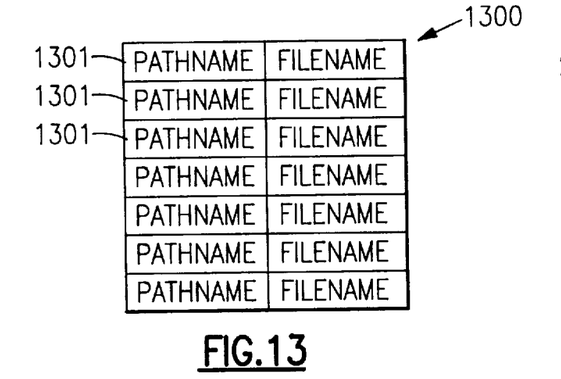
FIG. 13 shows the object module file list.

FIG. 7 shows a library contents file 700. As shown in that figure, a library contents file 700 contains a list of object module names 701–705 (recorded as character strings) in a designated search library 105 or 114, either remote or local, that was specified (as by a LIBDEF parameter) on the linkage editor invocation. The library contents file 700 is stored by the linkage editor 103 in a temporary library TEMPLIB1 (FIG. 11) or TEMPLIB2 (FIG. 12) and the TEMPLIB1 or TEMPLIB2 path is added to a search library list (FIG. 10) for subsequent location of specific object modules when INCLUDE statements or External Reference records are encountered within the linkage editor input stream 104.

Note that the object module search path specifications are not limited to linkage editor invocation performed via line commands and associated parameters. The same method would apply to graphical tools where the search libraries are enumerated in appropriate linkage editor settings windows or profiles.

FIGS. 5A–5D show the steps in a preferred embodiment for processing remote libraries 114 for retrieving object modules 202 for inclusion in a load module 405.

Figure 5A:
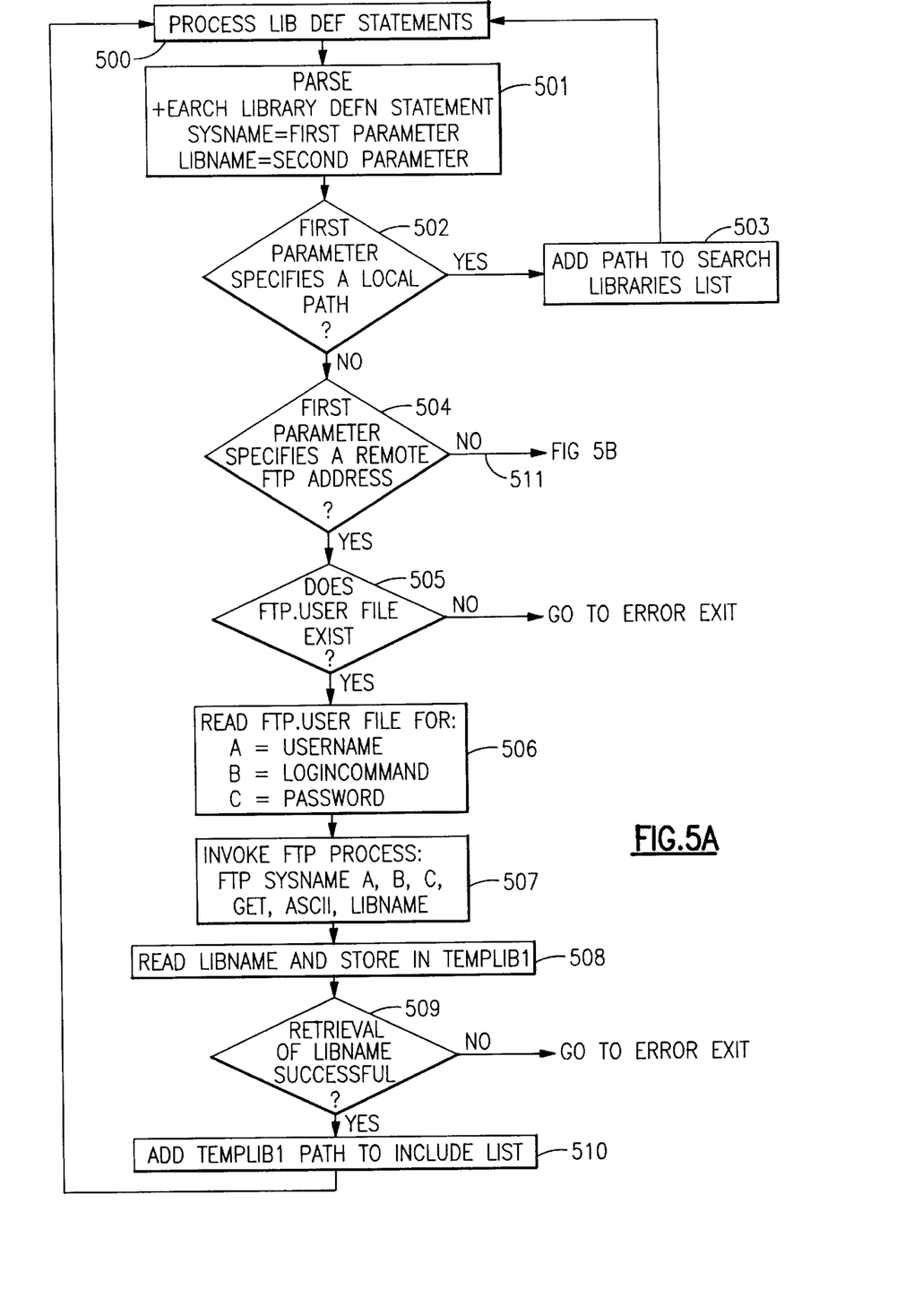
FIGS. 5A–5D show the steps in a preferred embodiment for processing remote libraries for retrieving object modules for inclusion in a load module.
Figure 5B:
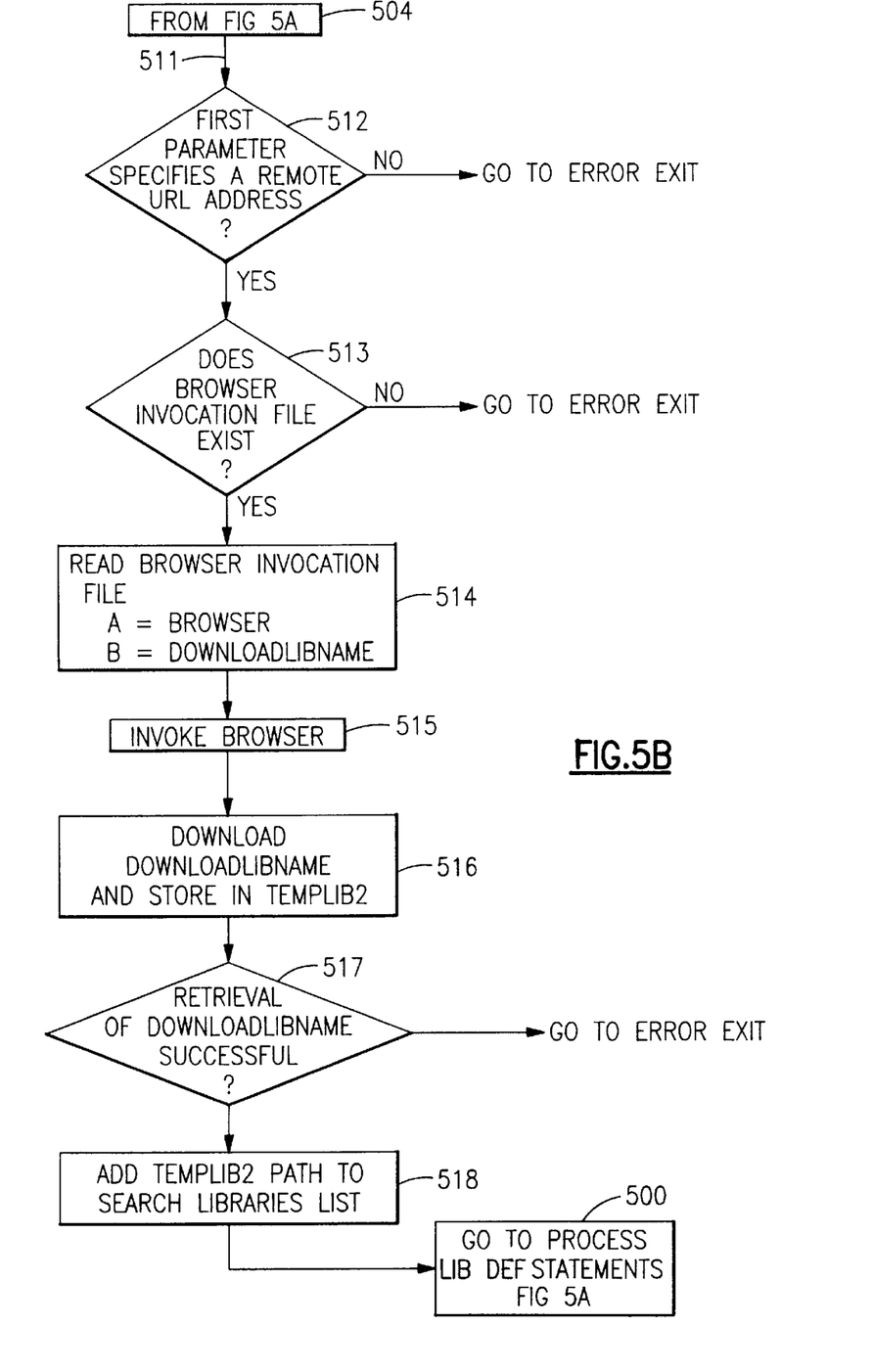

FIGS. 5A–5B show the routine 500 for processing search library definition statements. Routine 500 parses the search library definition statements (e.g., the LIBDEF job control statement of the linkage editor invocation command) and extracts appropriate system names (SYSNAME) and library names (LIBNAME) (step 501). If the first parameter (SYSNAME) specifies a local path (step 502), the path is added as an entry 1001 to a search library list 1000 (FIG. 10) (step 503). If the first parameter does not specify a local path, then it indicates a remote path and is evaluated with respect to the type of access.

If the first parameter (SYSNAME) specifies a remote FTP address (step 504), a check is made for the presence of an FTP.USER file; if the file does not exist, processing is terminated (step 505). Otherwise, the file is read and the following information is extracted from it: username, login command, and user password for FTP access (step 506).

Then, using the extracted information, FTP is initiated to the specified remote system 110, and the presence of the search library name (LIBNAME) on the remote FTP host is verified (step 507). If the specified search library 114 is present on the remote system 110, its library contents file 700 (FIG. 7), containing the file names of the object modules 202 in that library, is retrieved and stored in a temporary library 1100 (TEMPLIB1) on the local system 100 (FIG. 10) (step 508). If retrieval of LIBNAME is successful (step 509), the TEMPLIB1 path is added as an entry 1001 to the search library list 1000 (step 510); otherwise, processing is terminated.

If at step 504 the first parameter SYSNAME is found not to specify a remote FTP address, then control passes to the portion of the routine 500 shown in FIG. 5B (step 511). There the first parameter SYSNAME is checked to see if it is a remote URL address and, if it is not, processing is terminated (step 512). (Processing in FIGS. 5A–5B is restricted to FTP and HTTP access for the sake of simplicity; those skilled in the art will note that other types of remote access can be used.) If the first parameter SYSNAME is ascertained to be a remote URL address, the routine 500 checks for the presence of a browser invocation file; if the file does not exist, processing is terminated (step 513). Otherwise, the browser invocation file is read and two items of data are extracted: the name of the browser program to be used for accessing the remote URL and the name of the library contents file 700 (FIG. 7) to download (step 514). Then, the browser is invoked (step 515) and the specified remote library contents file 700 is stored in a temporary library 1200 (TEMPLIB2) on the local system 100 (step 516). If the retrieval of the specified library contents file 700 was not successful, processing is terminated (step 517). Otherwise, the TEMPLIB2 path is added as an entry 1001 to the search library list 1000 (step 518) and control returns to step 501.

Figure 5C:
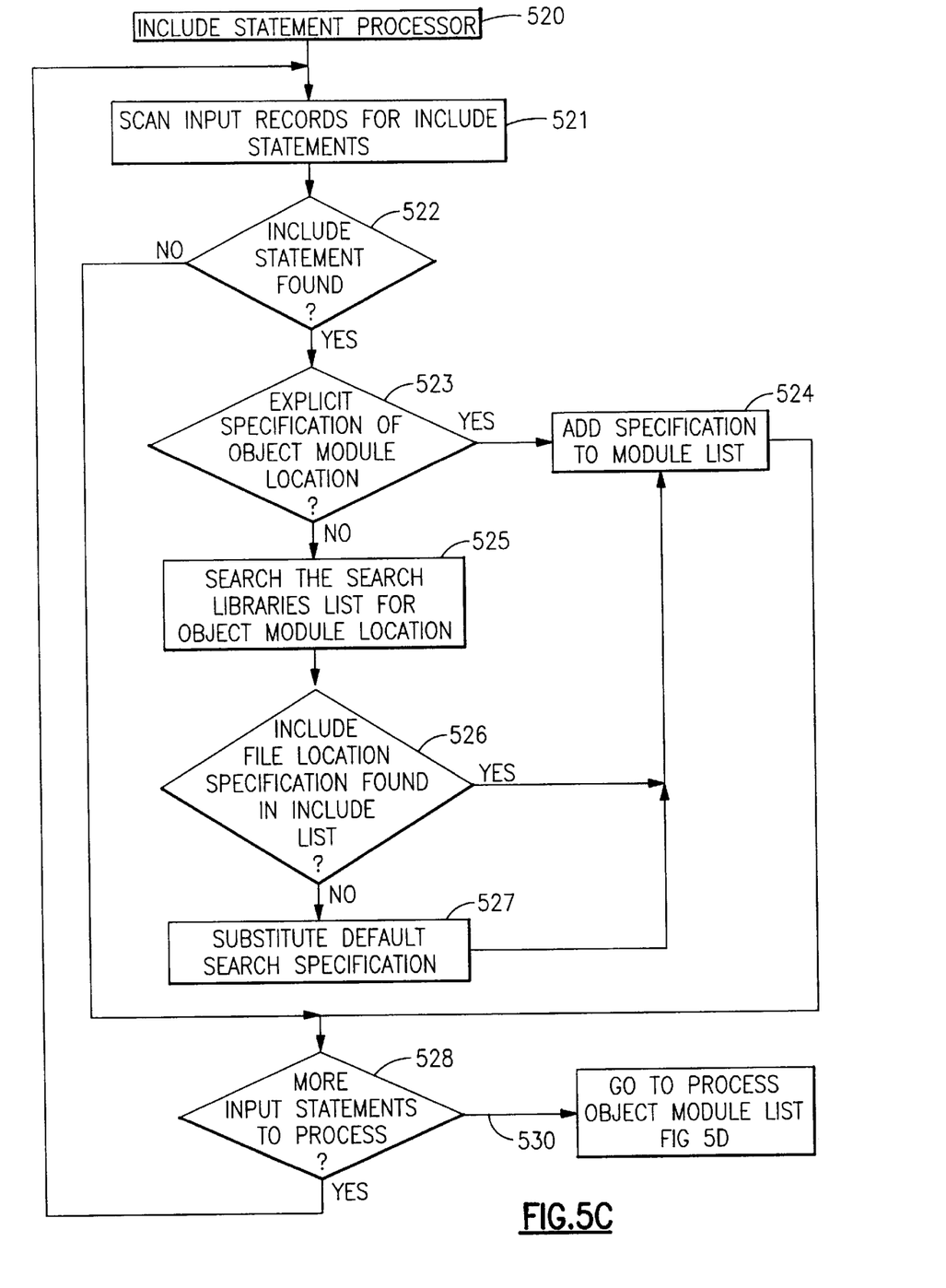

FIG. 5C shows the routine 520 for processing linkage editor INCLUDE statements, both explicit and implicit, contained in linkage editor input stream 104. Linkage editor input records 104 are examined one at a time to detect the presence of an INCLUDE statement (step 521). When an INCLUDE statement is detected (step 522) that has an explicit specification of an object module 202, including path name and file name (step 523), that specification is added as an entry 1301 to an object module list 1300 (step 524) and the routine 520 then resumes examining source code statements at step 521.

If at step 523 an INCLUDE statement is found that does not contain an explicit specification of the object module location, the search library list 1000 is searched to determine the object module location (step 525). This is done by searching each of the search paths 1001 contained in the search library list 1000, as well as searching the library contents files 700 in temporary libraries 1100 (TEMPLIB1) and 1200 (TEMPLIB2) if their paths are contained in the list 1000. If the object module 202 is found in this search of the paths contained in search library list 1000 (step 526), its specification (including path name and file name) is added as an entry to the object module list 1300 (step 524), and examination of linkage editor input records 104 resumes (step 521). If the object module location does not appear in the search library list 1000, the default search specification is substituted (step 527) and added to the object module list 1300 (step 524). If there are remaining input records to process (step 528), examination of input records resumes at step 521; otherwise, control passes to the routine 530 (FIG. 5D) for processing the object module list 1300.

Figure 5D:
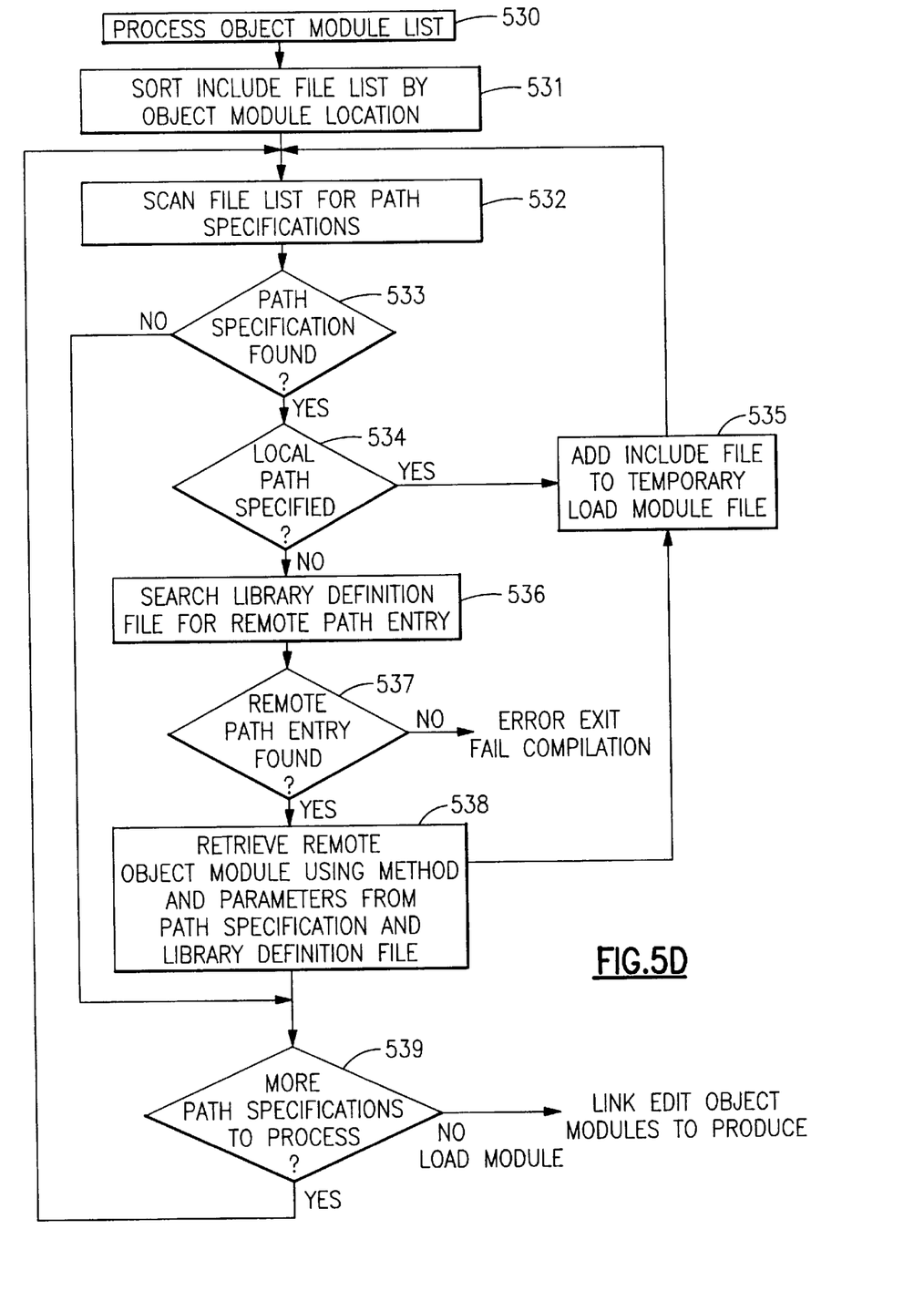

FIG. 5D shows the routine 530 for processing the object module list 1300. The object module list 1300 is first sorted by location so that all entries 1301 for object modules 202 residing in the same location are together (step 531). The file list 1300 is then scanned for path specifications (step 532). If a path specification is found (step 533), it is examined to determine whether it specifies a local path (step 534). If a local path is specified, the object module 202, if it exists, is copied to an object module temporary load module file (not shown) (step 535). If the path specification is not a local path, then it is a remote path and the library definition file 600 (FIG. 6) is searched for an entry corresponding to the remote path specification (step 536). If the corresponding entry is not found in the library definition file 600 (step 537), the link edit fails and an error exit is taken. Otherwise, the remote object module 202 is retrieved from the remote location 110 using the retrieval method and parameters specified by the path specification and the corresponding library definition file entry (step 538). When the remote object module 202 is retrieved, it is added to the temporary load module file (step 535).

The object module list 1300 is processed until all entries 1301 have been processed (step 539), and then the link edit of the object modules in the input stream 104 together with the object module temporary load module file just assembled is initiated using well known linkage editor techniques. After the link edit has been completed, all temporary local files are deleted, including the temporary load module file.

Figure 6:
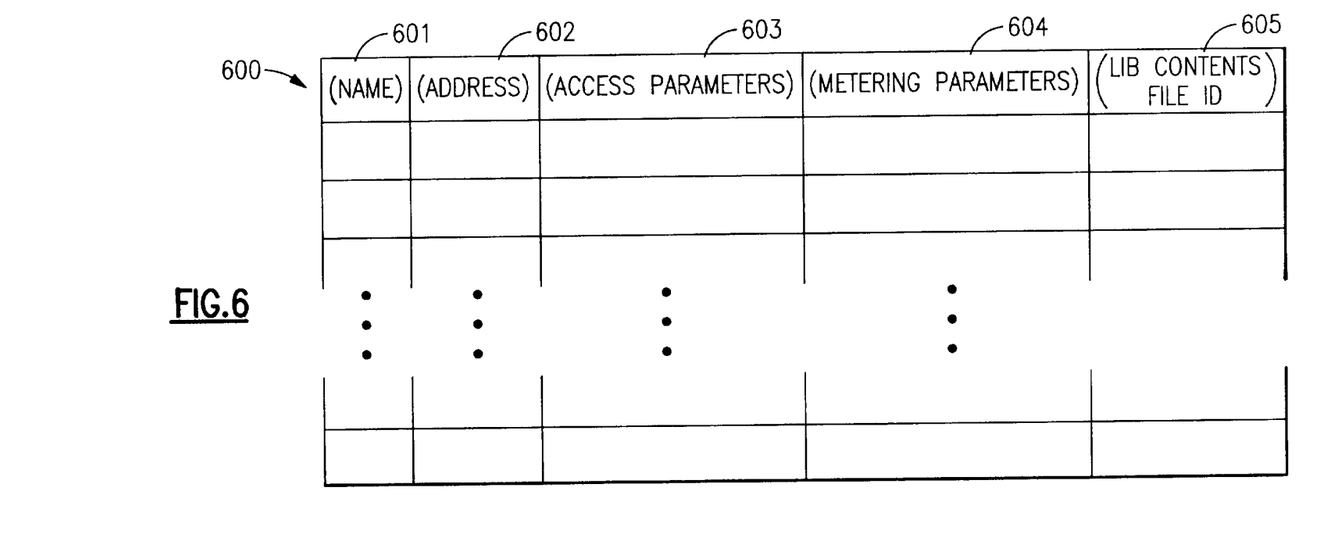
FIG. 6 shows a library definition file.

FIG. 6 shows schematically the composition of the library definition file 600 used for retrieving remote object modules using the File Transfer Protocol (FTP) or Hypertext Transfer Protocol (HTTP). The library definition file 600 includes a number of entries (one per library 114 defined). Each entry contains five items of data: library name 601, library address (remote location) 602, library access parameters (pertinent to the specified library access method) 603, library metering parameters 604, and library contents file identifier 605.

Most linkage editors permit their users to generate listings (hard or softcopy). These listings usually indicate from where (which library 105 or 114) a particular object module was taken. With the present invention, the listing will also indicate which system an object module came from and which method was used for retrieval.

Figure 9:
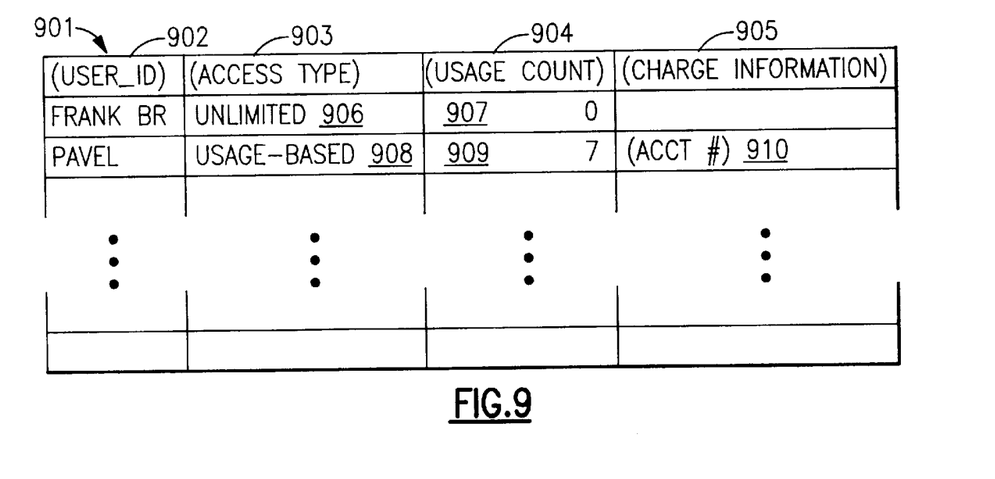
FIG. 9 shows a user table.

FIG. 9 shows a user table 901 containing user information associated with user access to the object modules on a remote network server. The user table 901 contains identifiers (USER_ID) 902 of valid users having the right to access the object modules on a network server. Note that in practice, the user IDs 902 will most likely be randomly or sequentially generated alphanumeric strings without any particular meaning attached; in fact, the most likely user ID is the customer license number. Along with each user ID 902, an access type field 903 is included, indicating whether the access is unlimited (as at 906) or usage based (as at 908). A usage count field 904 is set to 0 (as at 907) initially for all new users, and incremented to indicate the usage count (as at 909) with every use. Every time a user is billed for a particular number of uses, the usage count is transferred to the billing system (not shown) and the usage count field 904 is reset to 0. For usage-based users, a charge information field 905 is included, indicating a user account number 910 for billing purposes.

Figure 8:
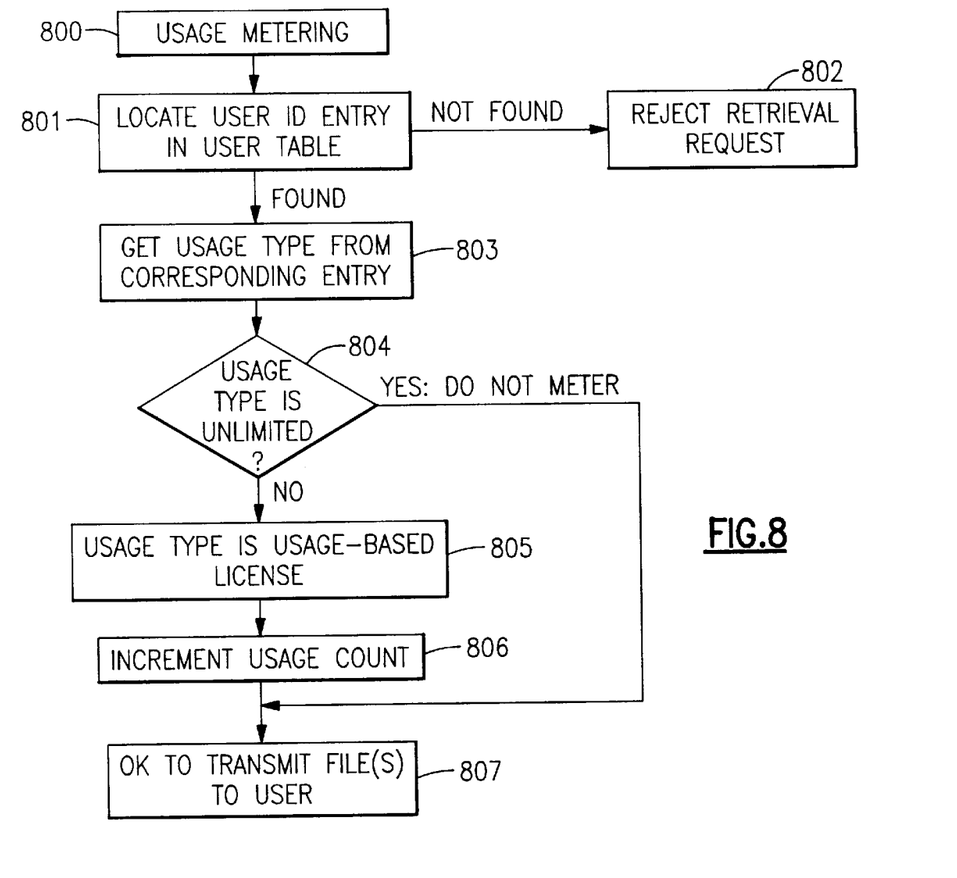
FIG. 8 shows usage metering performed by a remote include-file server executing in a second computer system.

FIG. 8 shows the usage metering procedure 800 performed by the remote object module server 110. If usage metering is required, the user ID entry 902 of the user accessing a library 114 is searched for in the user table 901 (step 801). If the user ID is not found among the USER_ID entries 902 in the user table 901, the user is not recognized as a valid user who is entitled to access that library 114, and the retrieval request is rejected (step 802). Otherwise, the access type 903 is retrieved from the user table entry associated with the present user (step 803). If the access type 903 indicates that the present user is entitled to unlimited usage (as at 906), metering is suspended (step 804); on the other hand, if the access type 903 indicates a usage-based license (step 805), the usage count field 904 associated with the present user (initialized to zero prior to the first use) is incremented (step 806). Then the retrieval of the requested object module(s) is permitted (step 807).

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. In a computer linkage editor for editing an input stream comprising one or more include statements into an executable load module, each of said include statements directing the replacement of the statement with the contents of an object module specified by the statement, a method of operating said linkage editor to process said include statements, comprising the steps of:

scanning said input stream for include statements specifying object modules resident at non-connected network locations;

in response to detecting an include statement specifying an object module, adding an entry for said object module to an object module list;

scanning said object module list for entries for object modules resident at non-connected network locations; and in response to detecting an entry for an object module resident at a non-connected network location, establishing a connection with said network location and obtaining said object module via said connection.

2. The method of claim 1 in which the detected include statement specifies a network address of said non-connected network location.

3. The method of claim 1 in which the detected include statement specifies a name of said non-connected network location that is resolvable by a name server.

4. The method of claim 1 in which the detected include statement specifies a uniform resource locator for said object module.

5. The method of claim 1 in which the entries in said object module list are sorted by location before being scanned.

6. In a computer linkage editor for editing an input stream comprising one or more object modules and one or more include statements into an executable load module, each of said include statements directing the replacement of the statement with the contents of an object module specified by the statement, apparatus for processing said include statements, comprising:

means for scanning said input stream for include statements specifying object modules resident at non-connected network locations;

means responsive to the detection of an include statement specifying an object module for adding an entry for said object module to an object module list;

means for scanning said object module list for entries for object modules resident at non-connected network locations; and in response to detecting an entry for an object module resident at a non-connected network location, establishing a connection with said network location and obtaining said object module via said connection.

7. The apparatus of claim 6 in which the entries in said object module list are sorted by location before being scanned.

8. A program storage device readable by a machine, tangibly embodying a program of instructions executable by the machine to perform method steps for operating a computer linkage editor to process one or more include statements in an input stream on a local system, said linkage editor editing said input stream into an executable load module, each of said include statements directing the replacement of the statement with the contents of an object module specified by the statement, said method steps comprising:

scanning said input stream for include statements specifying object modules resident at non-connected network locations;

in response to detecting an include statement specifying an object module, adding an entry for said object module to an object module list;

scanning said object module list for object modules resident at non-connected network locations; and in response to detecting an entry for an object module resident at a non-connected network location, establishing a connection with said network location and obtaining said object module via said connection.

9. The program storage device of claim 8 in which the entries in said object module list are sorted by location before being scanned.

10. In a computer linkage editor for editing an input stream comprising one or more include statements into an executable load module, each of said include statements directing the replacement of the statement with the contents of an object module specified by the statement, said linkage editor also receiving as input one or more library definition statements, each of which specifies an object module library containing one or more object modules, a method of operating said linkage editor to process said include statements, comprising the steps of:

examining each of said library definition statements to determine whether the library definition statement specifies an object module library resident at a non-connected network location;

in response to detecting an library definition statement specifying an object module library resident at a non-connected network location, establishing a connection with said network location and obtaining a list of the contents of said object module library via said connection;

scanning said input stream for include statements specifying object modules resident at non-connected network locations; and in response to detecting an include statement specifying an object module resident at a non-connected network location, establishing a connection with said network location and obtaining said object module via said connection.

11. The method of claim 10, comprising the further step of storing said list in a temporary library accessible to said linkage editor.

12. The method of claim 11 in which lists of the contents of a plurality of remotely resident object module libraries are stored in said temporary library.

13. The method of claim 11 in which said temporary library has a path specification, said method comprising the further step of adding said path specification to a list of path specifications for object module libraries.

14. The method of claim 10, comprising the further step of:

storing library definition data on said local system for object module libraries resident at non-connected network locations.

15. The method of claim 14 in which said data specifies the network locations of said libraries.

16. The method of claim 14 in which said data specifies access parameters for said libraries.

17. The method of claim 14 in which said data specifies metering parameters for said libraries.

18. The method of claim 14 in which said data specifies the object modules contained in said libraries.

19. The method of claim 18 in which said scanning step comprises the steps of:

scanning said input stream for include statements; and in response to detecting an include statement, determining whether said include statement specifies an object module resident at non-connected network locations.

20. The method of claim 19 in which said determining step comprises the step of:

examining the object modules specified for each of the libraries in said library definition file to determine the library containing the object module referenced in said statement.

21. In a computer linkage editor for editing an input stream comprising one or more object modules and one or more include statements into an executable load module, each of said include statements directing the replacement of the statement with the contents of an object module specified by the statement, said linkage editor also receiving as input one or more library definition statements, each of which specifies an object module library containing one or more object modules, apparatus for processing said include statements, comprising:

means for examining each of said library definition statements to determine whether the library definition statement specifies an object module library resident at a non-connected network location;

means responsive to detecting an library definition statement specifying an object module library resident at a non-connected network location for establishing a connection with said network location and obtaining a list of the contents of said object module library via said connection;

means for scanning said input stream for include statements specifying object modules resident at non-connected network locations; and means responsive to the detection of an include statement specifying an object module resident at a non-connected network location for establishing a connection with said network location and obtaining said object module via said connection.

22. A program storage device readable by a machine, tangibly embodying a program of instructions executable by the machine to perform method steps for operating a computer linkage editor to process one or more include statements in an input stream on a local system, said linkage editor editing said input stream into an executable load module, each of said include statements directing the replacement of the statement with the contents of an object module specified by the statement, said linkage editor also receives as input one or more library definition statements, each of which specifies a library containing one or more object modules, said method steps comprising:

examining each of said library definition statements to determine whether the statement specifies an object module library resident at a non-connected network location;

in response to detecting an library definition statement specifying an object module library resident at a non-connected network location, establishing a connection with said network location and obtaining a list of the contents of said object module library via said connection;

scanning said input stream for include statements specifying object modules resident at non-connected network locations; and in response to detecting an include statement specifying an object module resident at a non-connected network location, establishing a connection with said network location and obtaining said object module via said connection.

* * * * *